United States Patent
Chen et al.

(10) Patent No.: US 10,826,256 B2
(45) Date of Patent: Nov. 3, 2020

(54) WIRELESS COMMUNICATION DEVICE WITH REDUCED CONNECTIONS FOR POWER AND DATA

(71) Applicant: NANNING FUGUI PRECISION INDUSTRIAL CO., LTD., Nanning (CN)

(72) Inventors: Ming-Tsung Chen, New Taipei (TW); Hsing-Hsu Chen, New Taipei (TW); Ren-Tsung Cheng, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 86 days.

(21) Appl. No.: 16/225,330

(22) Filed: Dec. 19, 2018

(65) Prior Publication Data

US 2020/0203903 A1    Jun. 25, 2020

(51) Int. Cl.
*H01Q 1/24* (2006.01)
*H01R 24/64* (2011.01)
*G06F 1/26* (2006.01)

(52) U.S. Cl.
CPC .............. *H01R 24/64* (2013.01); *G06F 1/266* (2013.01); *H01R 2201/02* (2013.01)

(58) Field of Classification Search
CPC ............ H01Q 1/244; H01Q 1/24; H01Q 1/10; H01Q 1/12; H01Q 1/1264; H01Q 1/20; H01Q 1/22; H01Q 3/08; H04Q 1/28; H04W 52/02; H01R 24/64; H01R 13/40; H01R 13/64; H01R 13/648; G06F 13/42; G06F 1/26; G06F 1/266
See application file for complete search history.

(56) References Cited

U.S. PATENT DOCUMENTS

| 7,432,868 | B2 * | 10/2008 | Webb | H01Q 1/08 343/766 |
| 7,579,993 | B2 * | 8/2009 | Lev | H01Q 1/084 343/702 |
| 9,160,392 | B2 * | 10/2015 | Bartholomew | H04B 1/3833 |
| 10,283,920 | B2 * | 5/2019 | Chung | H01R 31/065 |
| 10,452,589 | B2 * | 10/2019 | Beckman | H04W 76/30 |
| 2013/0157509 | A1 * | 6/2013 | Srivastava | G08C 17/02 439/625 |

FOREIGN PATENT DOCUMENTS

| TW | M554643 U | 1/2018 |
| TW | 201824762 A | 7/2018 |

* cited by examiner

*Primary Examiner* — Tho G Phan
(74) *Attorney, Agent, or Firm* — ScienBiziP, P.C.

(57) ABSTRACT

A wireless communication device using a reduced cable set includes a power supply module, a rotation module, and a communication module. The rotation module includes jack connector with first power and data pins. The communication module is rotatably connected to the power supply module by the rotation module. The communication module includes a plug connector with second power and data pins. Each first power pin is connected to one second power pin to connect the power supply module and the communication module. Each first data pin is connected to one second data pin for transmitting data between the power supply module and the communication module.

18 Claims, 7 Drawing Sheets

WIRELESS COMMUNICATION DEVICE WITH REDUCED CONNECTIONS FOR POWER AND DATA

FIELD

The subject matter herein generally relates to wireless communication devices.

BACKGROUND

Wireless communication devices may need power supply units for electric power and communication units for communicating with other peripheral devices. However, cables are needed for enabling electric power supply and data connection. The cables are unsightly and easily tangle. The risk of accidental disconnecting between the power supply unit and the communication unit is high.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Figure 1:
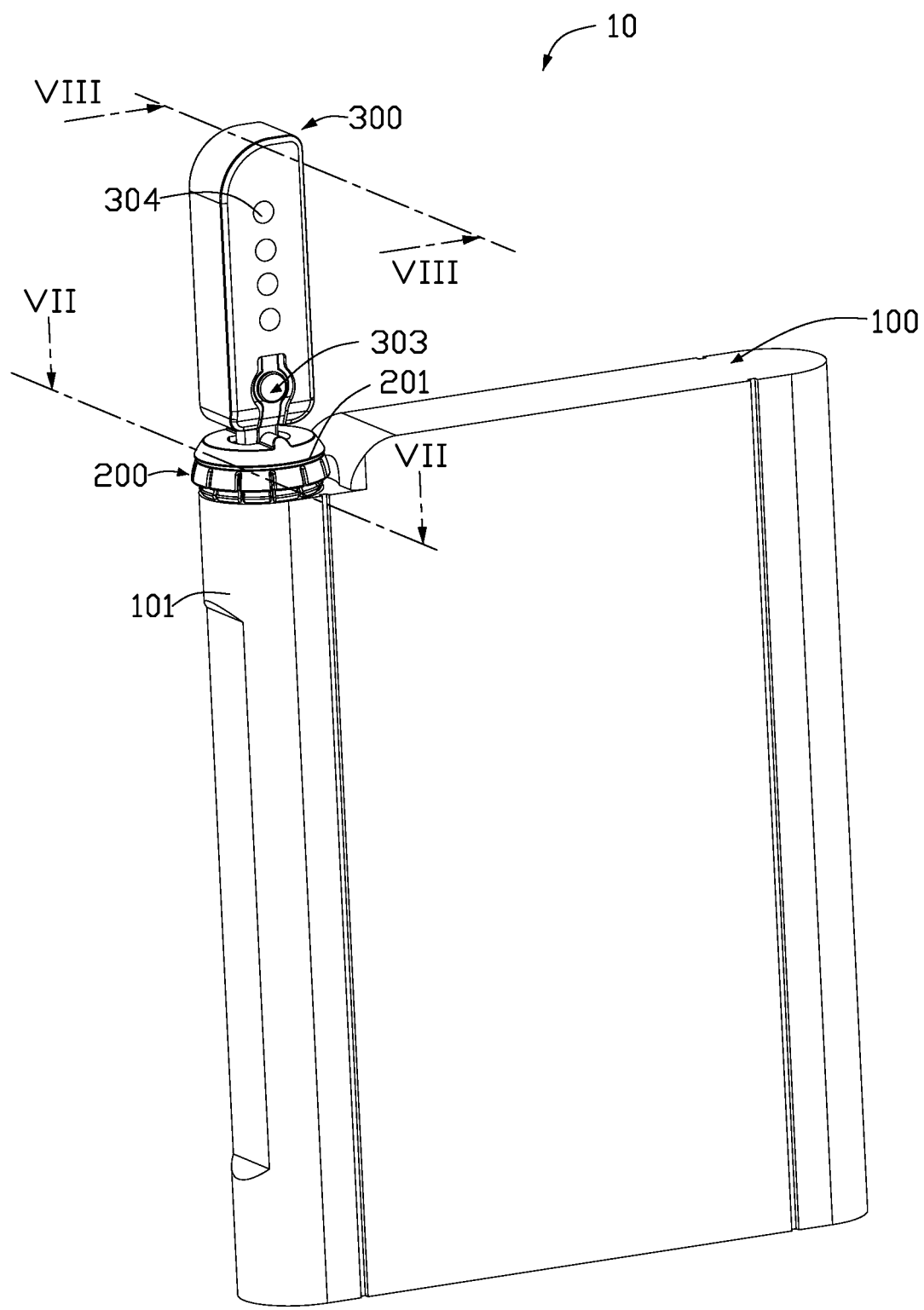
FIG. 1 is an isometric view of an embodiment of a wireless communication device according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
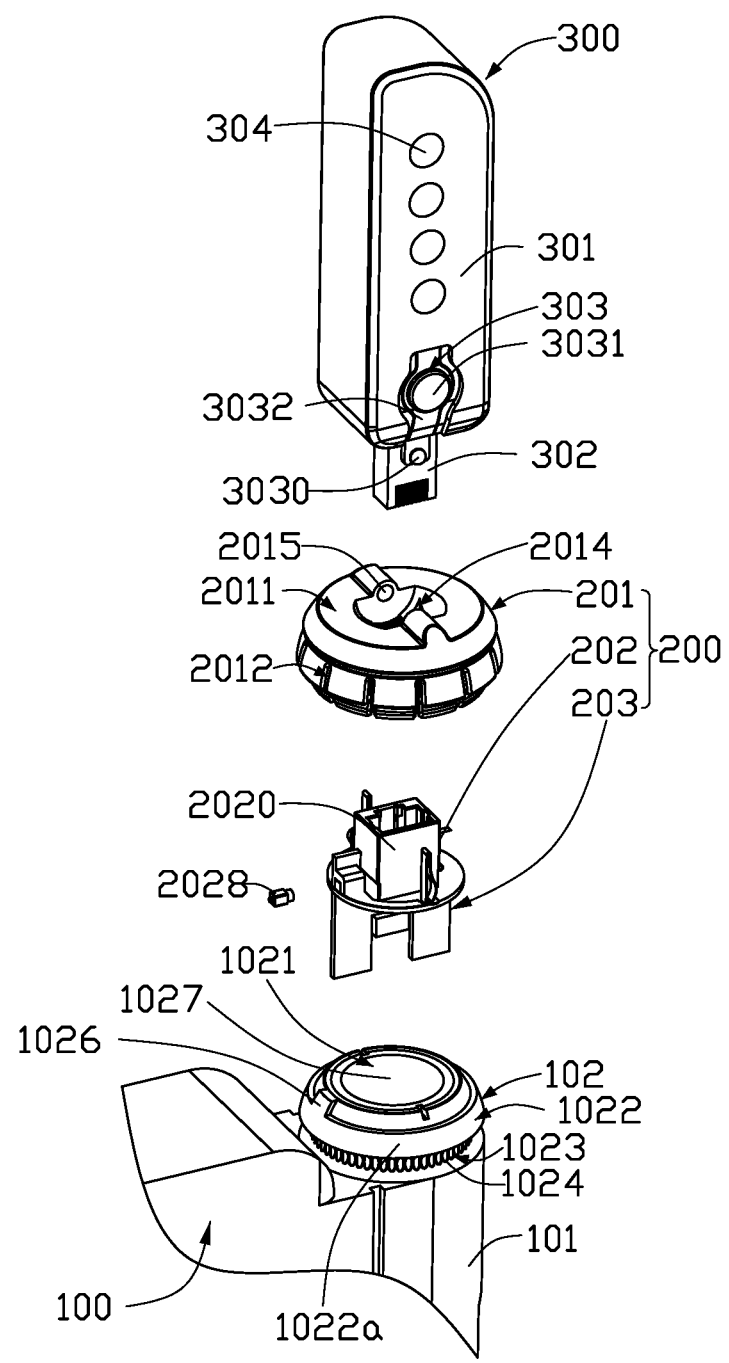
FIG. 2 is an exploded view of the wireless communication device of FIG. 1.
Figure 3:
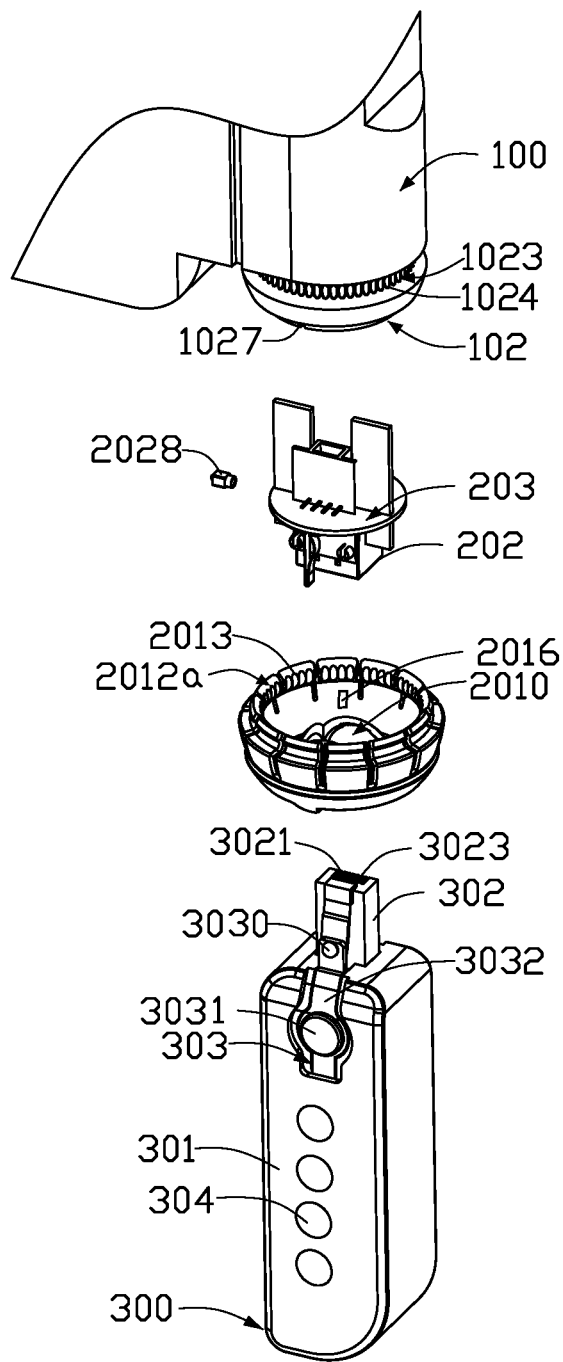
FIG. 3 is similar to FIG. 2, but showing the wireless communication device from another angle.
Figure 4:
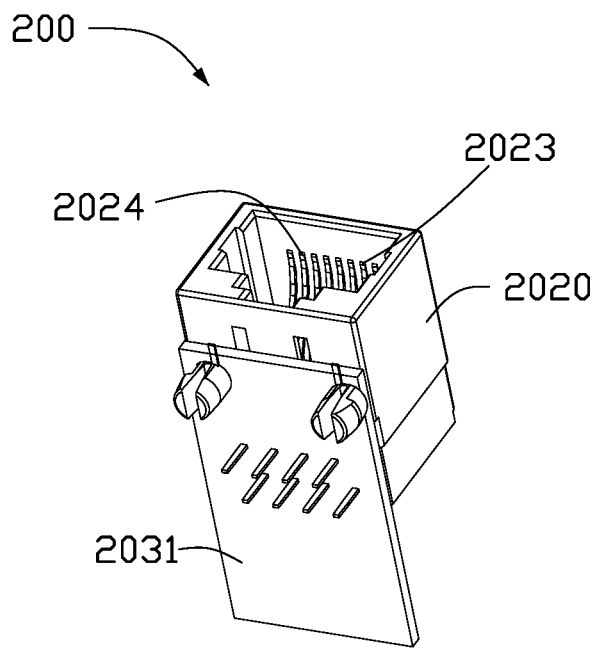
FIG. 4 is an isometric view of a rotation module of the wireless communication device of FIG. 2.
Figure 4:
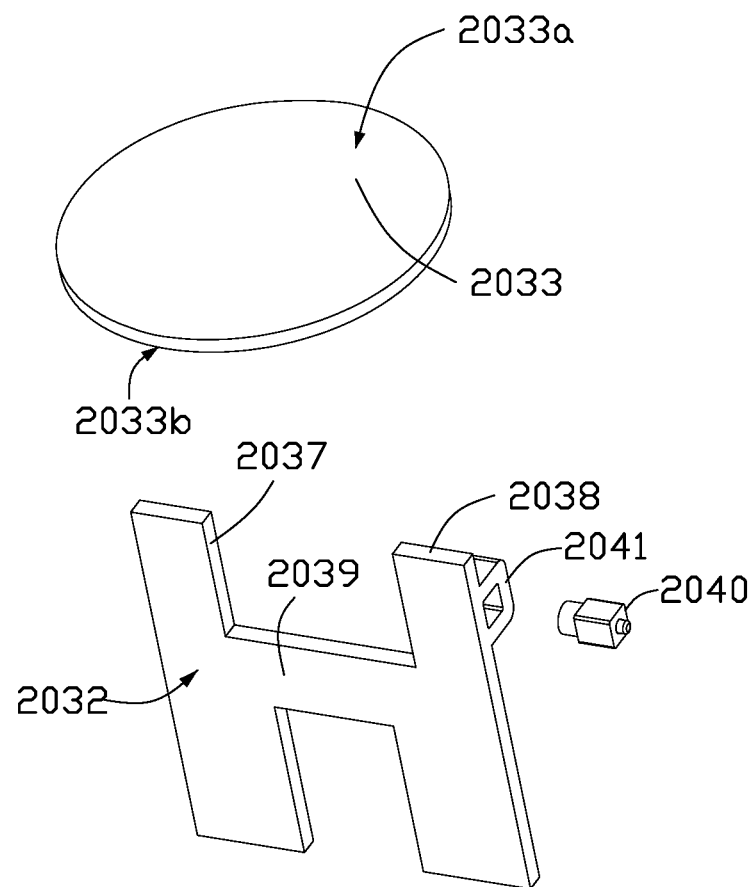

FIG. 1 illustrates an embodiment of a wireless communication device 10 including a power supply module 100, a rotation module 200, and a communication module 300. The rotation module 200 is rotatably connected to the power supply module 100. The communication module 300 is rotatably connected to the power supply module 100 by the rotation module 200, and rotating the rotation module 200 changes an intensity of the wireless signals transmitted by the communication module 300. FIGS. 2 to 4 illustrate that the rotation module 200 includes a jack connector 202. The jack connector 202 includes at least one first power pin 2024 and at least one first data pin 2023. The communication module 300 includes a plug connector 302. The plug connector 302 includes at least one second power pin 3021 and at least one second data pin 3023. Each first power pin 2024 is connected to one second power pin 3021 for transmitting electric power between the power supply module 100 and the communication module 300. Each first data pin 2023 is connected to one second data pin 3023 for transmitting data signals between the power supply module 100 and the communication module 300. In an embodiment, the jack connector 202 and the plug connector 302 are RJ45 connectors.

In an embodiment, the power supply module 100 includes a power supply 101 and a connection base 102 connected to the power supply 101. The connection base 102 includes a first top surface 1021 and a first sidewall 1022 protruding from and surrounding the edges of the first top surface 1021. The connecting base 102 is connected to the power supply 101 by the first sidewall 1022. The first top surface 1021 and the first sidewall 1022 cooperatively define a first receiving space 1020 (shown in FIG. 7) for receiving the jack connector 202. The first sidewall 1022 includes an outer surface 1022a and an inner surface 1022b (shown in FIG. 7) opposite to the outer surface 1022a. The outer surface 1022a of the connection base 102 defines an annular groove 1023. The annular groove 1023 includes a plurality of first latching teeth 1024 protruding from a bottom of the annular groove 1023. The rotation module 200 further includes a rotation cover 201. The rotation cover 201 is rotatably connected to the connection base 102. The rotation cover 201 includes a second top surface 2011 and a second sidewall 2012 protruding from and surrounding the edges of the second top surface 2011. The second top surface 2011 and the second sidewall 2012 cooperatively define a second receiving space 2010 for receiving the connection base 102. The second sidewall 2012 includes an inner surface 2012a. The inner surface 2012a of the second sidewall 2012 includes a plurality of second latching teeth 2013. When the connection base 102 is received in the second receiving space 2010, the first latching teeth 1024 engage with the second latching teeth 2013 to fix the instant engagement and prevent further rotation between the connection base 102 and the rotation cover 201.

Furthermore, the first top surface 1021 defines a first opening 1027 that communicates with the first receiving space 1020. The second top surface 2011 defines a second opening 2014 that is aligned with the first opening 1027. The jack connector 202 is fixedly received in the rotation cover 201, and exposed from the rotation cover 201 through the second opening 2014 and the first opening 1027, thereby allowing the plug connector 302 to be inserted into the jack connector 202.

In an embodiment, the outer surface 1022a of the connection base 102 further includes a stopping block 1026. The inner surface 2012a of the second sidewall 2012 further defines a first slot 2016. When the rotation cover 201 rotates relative to the connection base 102 to cause the stopping block 1025 to be received in the first slot 2016, a further rotation between the connection base 102 and the rotation cover 201 is also avoided.

In an embodiment, the rotation module 200 further includes a connection component 203. Referring to FIG. 4, the connection component 203 includes a first circuit board 2031, a limiting plate 2032, and a supporting base 2033. The supporting base 2033 includes a first surface 2033*a* and a second surface 2033*b* opposite to the first surface 2033*a*. The jack connector 202 is positioned on the first surface 2033*a* of the supporting base 2033. The limiting plate 2032 is positioned on the second surface 2033*b*. The first circuit board 2031 passes through the supporting base 2033. One end of the first circuit board 2031 is electrically connected to the jack connector 202, and the opposite end of the first circuit board 2031 is connected to the limiting plate 2032. In an embodiment, the first circuit board 2031 can be a flexible circuit board.

Furthermore, the inner surface 1022*b* of the connection base 102 includes a plurality of third latching teeth 1025. The limiting plate 2032 is substantially H-shaped, and includes a first portion 2037, a second portion 2038 substantially parallel to the first portion 2027, a third portion 2039 connected between the first portion 2037 and the second portion 2038, and a limiting element 2040. The end of the first circuit board 2031 can be fixed between the first portion 2037 and the second portion 2038.

Figure 5:
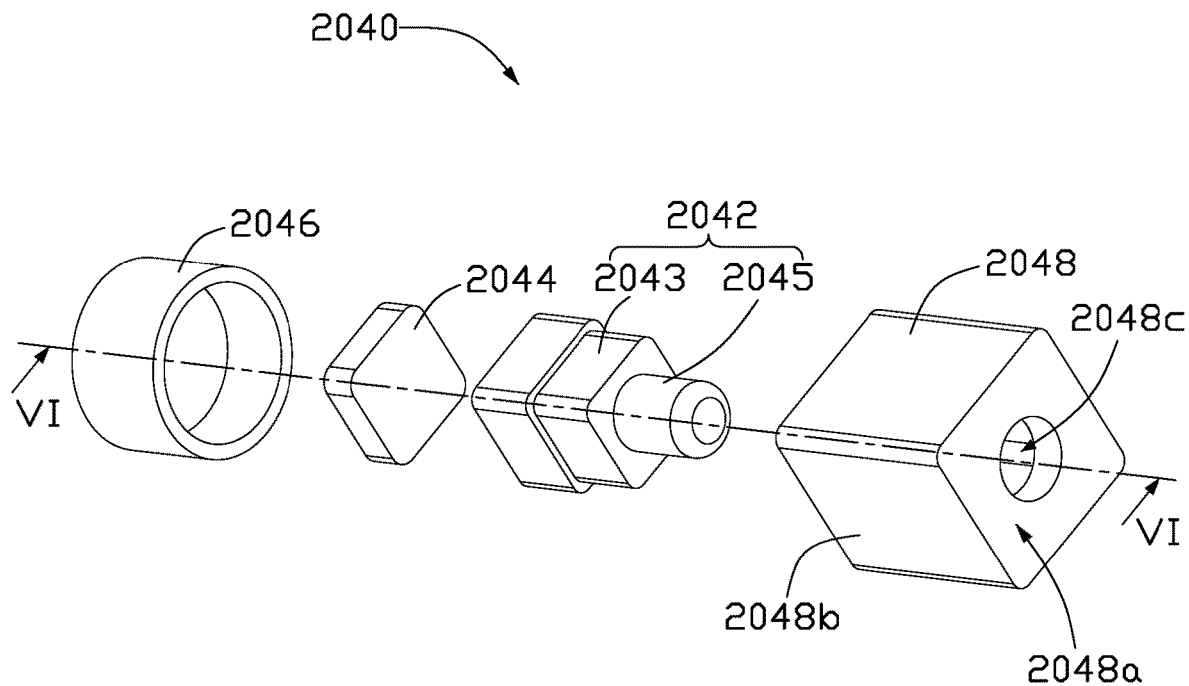
FIG. 5 is an exploded view of a limiting element of the rotation module of FIG. 4.
Figure 6:
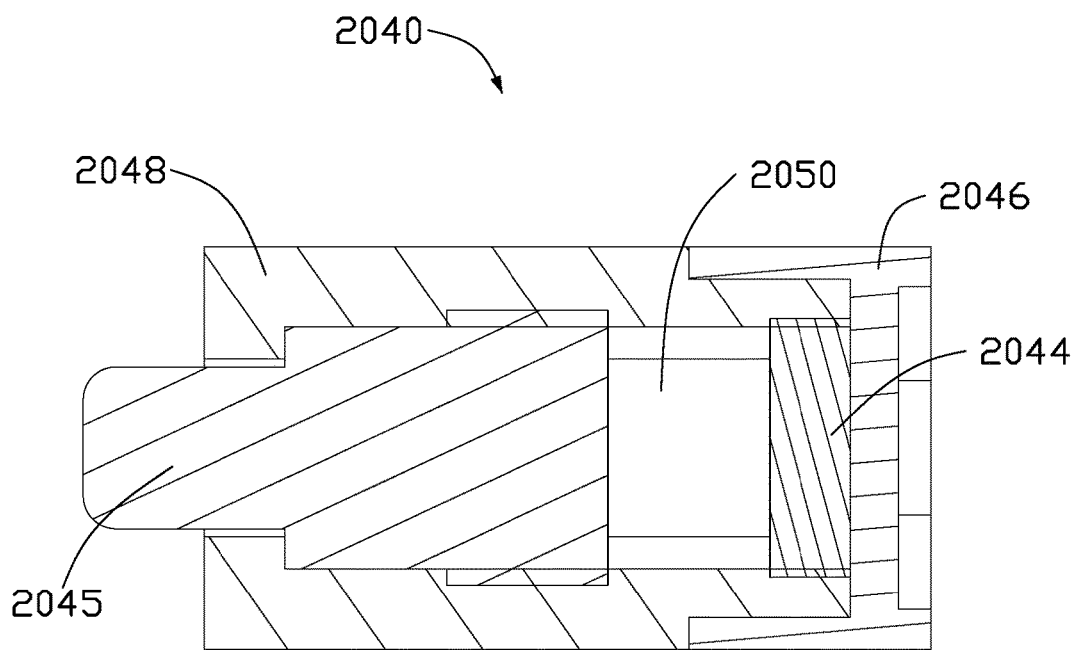
FIG. 6 is a cross-sectional view taken along line VI-VI of FIG. 5.
Figure 7:
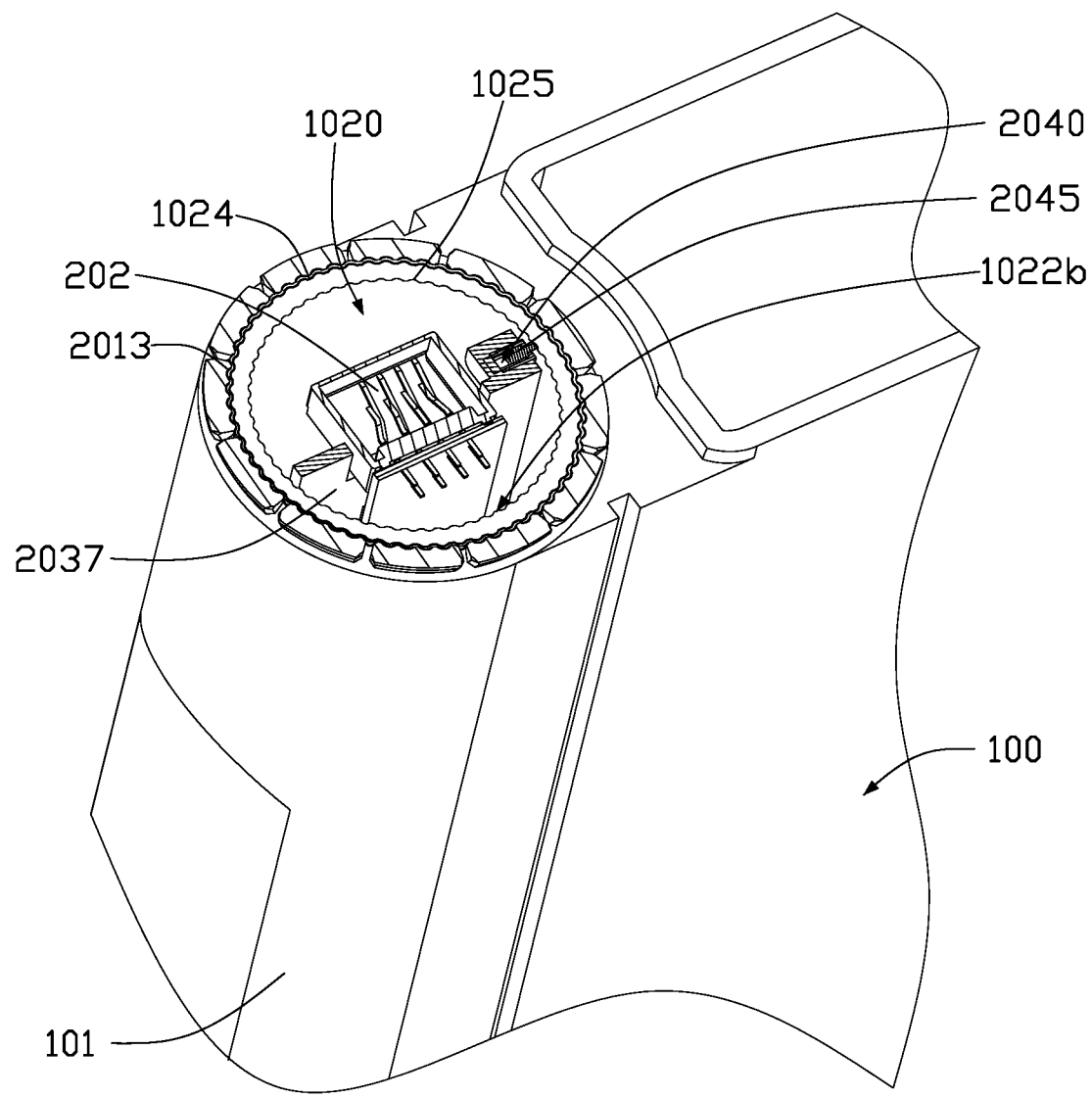
FIG. 7 is a cross-sectional view taken along line VII-VII of FIG. 1.

The second portion 2038 of the limiting plate 2032 includes a connection block 2041. The limiting element 2040 is fixed in the connecting block 2041. Referring to FIGS. 5 and 6, the limiting element 2040 includes a sliding block 2042, an elastic block 2044, an enclosing portion 2046, and a casing 2048. The casing 2048 includes a third top surface 2048*a* and a third sidewall 2048*b* protruding from and surrounding the edges of the third top surface 2048*a*. The enclosing portion 2046 closes an end of the third sidewall 2048*b* facing away from the third top surface 2048*a*. The sliding block 2042 is slidably received in the casing 2048. The elastic block 2044 is fixedly received in the casing 2048. The sliding block 2042, the elastic block 2044, and the casing 2048 cooperatively define a third receiving space 2050. The third top surface 2048*a* of the casing 2048 defines a third opening 2048*c*. The sliding block 2042 includes a sliding portion 2043 and a top portion 2045 connected to the sliding portion 2043. Referring to FIG. 7, the top portion 2045 of the sliding block 2042 protrudes from the third opening 2048*c*. When the rotation cover 201 rotates relative to the connection base 102, the top portion 2045 of the sliding block 2042 is pressed by the third latching teeth 1025 and then moves into the third receiving space 2050. Thus, air in the third receiving space 2050 is compressed. The compressed air pushes the sliding block 2042 to cause the top portion 2045 to protrude from the third opening 2048*c*. Then, the top portion 2045 can abut against two adjacent third latching teeth 1025. Thus, the rotation cover 201 can be fixed to the connection base 102, to allow the communication module 300 to be firmly connected to the rotation module 200 through the jack connector 202.

Figure 8:
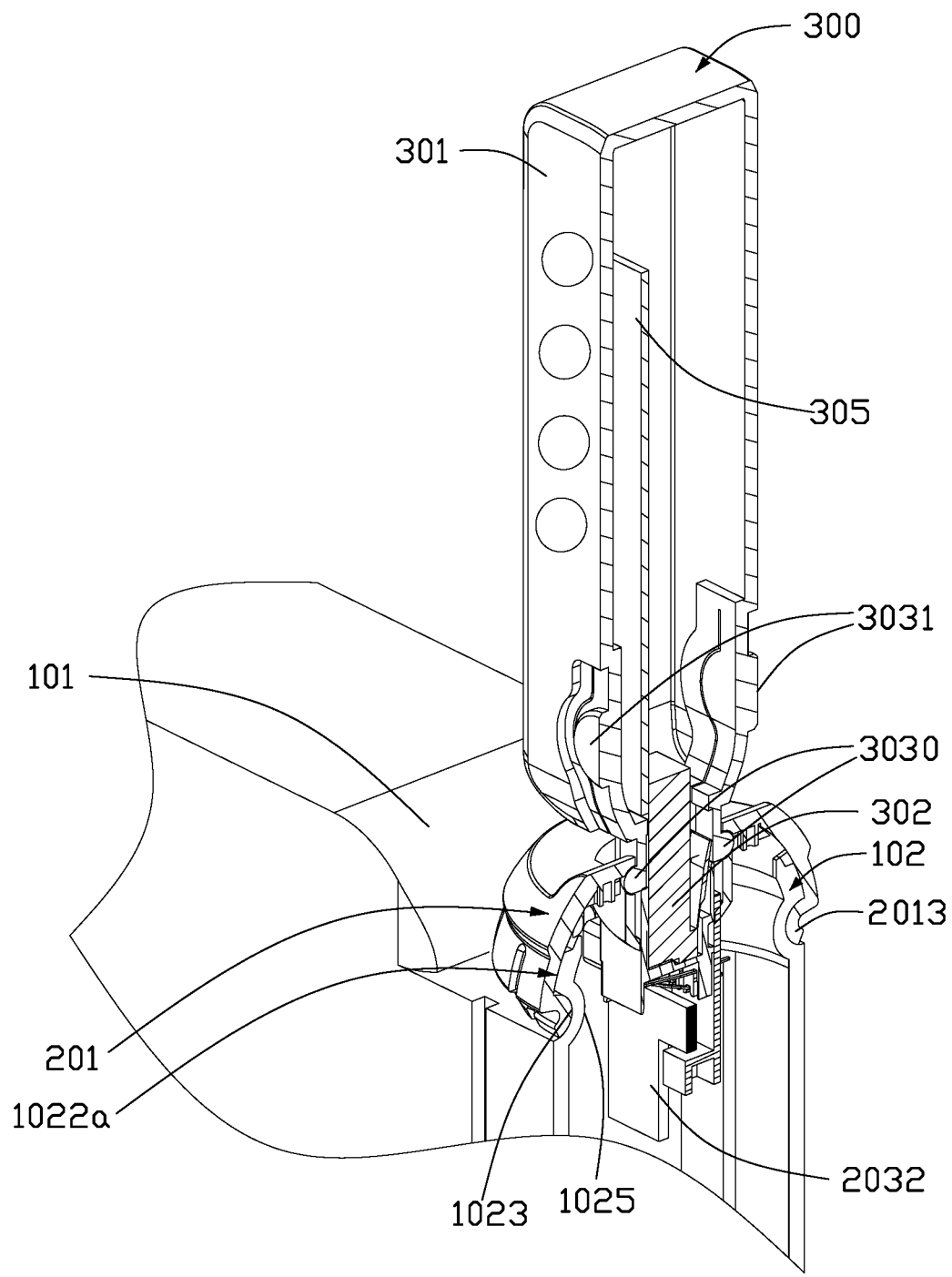
FIG. 8 is a cross-sectional view taken along line VIII-VIII of FIG. 1.

In an embodiment, the second top surface 2011 of the rotation cover 201 further includes two receiving holes 2015 at two opposite sides of the second opening 2014. The center axis of the receiving hole 2015 is parallel to the second top surface 2011. The communication module 300 further includes a housing 301, at least one operation component 303, a plurality of indication lamps 304, and a second circuit board 305 (shown in FIG. 8). The plug connector 302 protrudes from the housing 301. The second circuit board 305 is received in the housing 301 and electrically connected to the plug connector 302. The operation component 302 is arranged outside the housing 301.

Each operation component 303 includes an operation button 3031, a spring clip 3032, and a positioning pin 3030. The operation button 3031 and the positioning pin 3030 connect two opposite ends of the spring clip 3032 to the housing 301. When the operation button 303 is pressed, the spring clip 3032 deforms to press the positioning pin 3030. The spring clip 3032 can be released to be received in one receiving hole 2015, thereby fixing the plug connector 302 to the jack connector 202. The indication lamps 304 are electrically connected to the second circuit board 305. The indication lamps 304 indicate different intensities of the wireless signals transmitted by the communication module 300. For example, the indication lamps 304 can be arranged from the top of the housing 301 to the bottom of the housing 303. The higher the position of the indication lamp 304, the stronger the intensity of the wireless signals transmitted by the communication module 300. Thus, the second circuit board 305 can control one indication lamp 304 at a time to emit light, thereby indicating the intensity of the wireless signals transmitted by the communication module 300. Then, the user can find the best position of the communication module 300 through looking at the indication lamps 304.

With the above configuration, data pins and power pins are included in the wireless communication device 10, which decreases the connection complexity and prevents the cables from being tangled. Furthermore, disconnection between the power supply module 100 and the communication module 300 unit due to entangled cables may be rendered less likely.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wireless communication device comprising:
 a power supply module comprising a power supply and a connection base connected to the power supply, wherein the connection base comprises a first top surface and a first sidewall protruding from and surrounding edges of the first top surface;
 a rotation module rotatably connected to the power supply module, the rotation module comprising a jack connector, the jack connector comprising at least one first power pin and at least one first data pin, wherein the rotation module further comprises a rotation cover, the rotation cover is rotatably connected to the connection base, the rotation cover comprises a second top surface and a second sidewall protruding from and surrounding edges of the second top surface, and the second top surface and the second sidewall cooperatively define a second receiving space for receiving the connection base; and a communication module rotatably connected to the power supply module by the rotation module, the communication module comprising a plug connector, the plug connector comprising at least one second power pins and at least one second data pin, each of the first power pin connected to one of the second power pin for transmitting electric power between the power supply module and the communication module, and each of the first data pin connected to one of the second data pin for transmitting data signals between the power supply module and the communication module, wherein the first sidewall comprises an outer surface and an inner surface opposite to the outer surface, the outer surface of the connection base defines an annular groove, the annular groove comprises a plurality of first latching teeth protruding from a bottom of the annular groove, the second sidewall comprises an inner surface, the inner surface of the rotation cover comprises a plurality of second latching teeth, and the plurality of first latching teeth engage with the plurality of second latching teeth when the connection base is received in the second receiving space.

2. The wireless communication device of claim 1, wherein the connecting base is connected to the power supply by the first sidewall, and the first top surface and the first sidewall cooperatively define a first receiving space for receiving the jack connector.

3. The wireless communication device of claim 1, wherein the first top surface defines a first opening communicating with the first receiving space, the second top surface defines a second opening aligned with the first opening, the jack connector is exposed from the rotation cover through the second opening and the first opening, thereby allowing the plug connector to be inserted into the jack connector.

4. The wireless communication device of claim 3, wherein the second top surface of the rotation cover further comprises two receiving holes at two opposite sides of the second opening, a center axis of the receiving hole is parallel to the second top surface, the communication module further comprises a housing, at least one operation component, and a second circuit board, the plug connector protrudes from the housing, the second circuit board is received in the housing and electrically connected to the plug connector, each of the operation component is arranged outside the housing, and comprises an operation button, a spring clip, and a positioning pin, the operation button and the positioning pin connect two opposite ends of the spring clip to the housing, the spring clip deforms to press the positioning pin when the operation button is pressed, and the spring clip is released to be received in one of the receiving holes, thereby fixing the plug connector to the jack connector.

5. The wireless communication device of claim 4, wherein the communication module further comprises a plurality of indication lamps arranged outside the housing, the plurality of indication lamps are electrically connected to the second circuit board, and indicates different intensity of wireless signals transmitted by the communication module, the second circuit board controls a corresponding one of the indication lamps to emit light, thereby indicating the intensity of the wireless signals transmitted by the communication module.

6. The wireless communication device of claim 1, wherein the outer surface of the connection base further comprises a stopping block, the inner surface of the rotation cover further defines a first slot, and the stopping block is configured to be received in the first slot when the rotation cover rotates relative to the connection base.

7. The wireless communication device of claim 1, wherein the rotation module further comprises a connection component, the connection component comprises a first circuit board, a limiting plate, and a supporting base, the supporting base comprises a first surface and a second surface opposite to the first surface, the jack connector is positioned on the first surface of the supporting base, the limiting plate is positioned on the second surface, the first circuit board passes through the supporting base, a first end of the first circuit board is electrically connected to the jack connector, and a second end opposite to the first end of the first circuit board is connected to the limiting plate.

8. The wireless communication device of claim 7, wherein the limiting plate comprises a first portion, a second portion substantially parallel to the first portion, and a third portion connected between the first portion and the second portion, and the end of the first circuit board is fixed between the first portion and the second portion.

9. The wireless communication device of claim 7, wherein the inner surface of the connection base comprises a plurality of third latching teeth, the limiting plate further comprises a limiting element fixed to the second portion, the limiting element comprises a sliding block, an elastic block, an enclosing portion, and a casing, the casing comprises a third top surface and a third sidewall protruding from and surrounding edges of the third top surface, the enclosing portion closes an end of the third sidewall facing away from the third top surface, the sliding block is slidably received in the casing, the elastic block is fixedly received in the casing, the sliding block, the elastic block, and the casing cooperatively define a third receiving space, the third top surface of the casing defines a third opening, the sliding block comprises a sliding portion and a top portion connected to the sliding portion, the top portion of the sliding block protrudes from the third opening, when the rotation cover rotates relative to the connection base, the top portion of the sliding block is pressed by the plurality of third latching teeth and being moved into the third receiving space to compress air in the third receiving space, the compressed air pushes the sliding block to cause the top portion to protrude from the third opening and to abut against two adjacent third latching teeth, thereby fixing the rotation cover to the connection base.

10. The wireless communication device of claim 1, wherein the jack connector and the plug connector are RJ45 connectors.

11. A wireless communication device comprising:
a power supply module comprising a power supply and a connection base connected to the power supply, an inner surface of the connection base comprising a plurality of latching teeth;
a rotation module rotatably connected to the connection base, the rotation module comprising a jack connector and a connection component received in the connection base, the jack connector comprising at least one first power pin and at least one first data pin, the connection component comprising a limiting element, the limiting element comprising a sliding block, an elastic block, an enclosing portion, and a casing, the casing comprising a top surface and a sidewall protruding from and surrounding edges of the top surface, the enclosing portion closing an end of the sidewall facing away from the top surface, the sliding block slidably received in the casing, the elastic block fixedly received in the casing, the sliding block, the elastic block, and the casing cooperatively defining a receiving space, the top surface of the casing defining an opening, the sliding block comprising a sliding portion and a top portion connected to the sliding portion, the top portion of the sliding block protruding from the opening, wherein when the rotation module rotates relative to the connection base, the top portion of the sliding block is pressed by the plurality of latching teeth and moves into the receiving space to compress air in the receiving space, the compressed air pushes the sliding block to cause the top portion to protrude from the opening and to abut against two adjacent latching teeth, thereby fixing the rotation module to the connection base; and a communication module rotatably connected to the power supply module by the rotation module, the communication module comprising a plug connector, the plug connector comprising at least one second power pins and at least one second data pin, each of the first power pin connected to one of the second power pin, and each of the first data pin connected to one of the second data pin.

12. The wireless communication device of claim 11, wherein the connection base comprises a first top surface and a first sidewall protruding from and surrounding edges of the first top surface, the connecting base is connected to the power supply by the first sidewall, and the first top surface and the first sidewall cooperatively define a first receiving space for receiving the jack connector and the connection component.

13. The wireless communication device of claim 12, wherein the rotation module further comprises a rotation cover, the rotation cover is rotatably connected to the connection base, the rotation cover comprises a second top surface and a second sidewall protruding from and surrounding edges of the second top surface, and the second top surface and the second sidewall cooperatively define a second receiving space for receiving the connection base.

14. The wireless communication device of claim 13, wherein the first sidewall comprises an outer surface and an inner surface opposite to the outer surface, the outer surface of the connection base defines an annular groove, the annular groove comprises a plurality of first latching teeth protruding from a bottom of the annular groove, the second sidewall comprises an inner surface, the inner surface of the rotation cover comprises a plurality of second latching teeth, and the plurality of first latching teeth engage with the plurality of second latching teeth when the connection base is received in the second receiving space.

15. The wireless communication device of claim 13, wherein the first top surface defines a first opening communicating with the first receiving space, the second top surface defines a second opening aligned with the first opening, the jack connector is exposed from the rotation cover through the second opening and the first opening, thereby allowing the plug connector to be inserted into the jack connector.

16. The wireless communication device of claim 13, wherein the outer surface of the connection base further comprises a stopping block, the inner surface of the rotation cover further defines a first slot, and the stopping block is configured to be received in the first slot when the rotation cover rotates relative to the connection base.

17. The wireless communication device of claim 11, wherein the connection component further comprises a first circuit board, a limiting plate, and a supporting base, the limiting plate comprises the limiting element, the supporting base comprises a first surface and a second surface opposite to the first surface, the jack connector is positioned on the first surface of the supporting base, the limiting plate is positioned on the second surface, the first circuit board passes through the supporting base, a first end of the first circuit board is electrically connected to the jack connector, and a second end opposite to the first end of the first circuit board is connected to the limiting plate.

18. The wireless communication device of claim 17, wherein the limiting plate comprises a first portion, a second portion substantially parallel to the first portion, and a third portion connected between the first portion and the second portion, and the end of the first circuit board is fixed between the first portion and the second portion, and the limiting element is fixed to the second portion.

* * * * *